United States Patent
Leme et al.

(10) Patent No.: US 10,416,854 B2
(45) Date of Patent: Sep. 17, 2019

(54) AUTOFILL FOR A USER DEVICE

(71) Applicant: Google LLC, Mountain View, CA (US)

(72) Inventors: Felipe Leme, Belmont, CA (US); Svetoslav Ganov, San Francisco, CA (US); Benjamin Poiesz, San Jose, CA (US); Angela Sun, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 116 days.

(21) Appl. No.: 15/798,262

(22) Filed: Oct. 30, 2017

(65) Prior Publication Data

US 2018/0260086 A1 Sep. 13, 2018

Related U.S. Application Data

(60) Provisional application No. 62/468,011, filed on Mar. 7, 2017.

(51) Int. Cl.
*G06F 3/048* (2013.01)
*G06F 3/0484* (2013.01)
*G06F 3/0481* (2013.01)
*H04L 29/08* (2006.01)
*G06F 17/24* (2006.01)
*G06F 3/0482* (2013.01)

(52) U.S. Cl.
CPC .......... *G06F 3/0484* (2013.01); *G06F 3/0481* (2013.01); *G06F 17/243* (2013.01); *H04L 67/025* (2013.01); *H04L 67/306* (2013.01); *G06F 3/0482* (2013.01)

(58) Field of Classification Search
None
See application file for complete search history.

(56) References Cited

U.S. PATENT DOCUMENTS

| | | |
|---|---|---|
| 7,685,144 B1 | 3/2010 | Lalitesh et al. |
| 8,214,362 B1 | 7/2012 | Djabarov |
| 8,751,535 B1 | 6/2014 | Hoewon et al. |
| 9,230,214 B1 | 1/2016 | Joseph et al. |
| 9,465,786 B2 | 10/2016 | Lurey et al. |

(Continued)

OTHER PUBLICATIONS

Shaohua Wang et al., An Intelligent Framework for Auto-filling Web Forms from Different Web Applications, Jun. 1, 2013, IEEE Computer Society, pp. 175-179 (Year: 2013).*

(Continued)

*Primary Examiner* — Tam T Tran
(74) *Attorney, Agent, or Firm* — McDonnell Boehnen Hulbert & Berghoff LLP

(57) ABSTRACT

An example method includes receiving, by a user device, authorization to engage in autofill for an application displayed on the user interface (UI) of the user device. The method further includes detecting an autofill trigger event and determining a subset of content excluding user-specific information. The method also includes transmitting a request containing the subset to a remote provider for candidate data for use in autofill. The method further includes receiving a response from the remote provider containing one or more candidate values for use in autofill. The method additionally includes filling the one or more text input fields displayed on the UI with the corresponding one or more candidate values.

20 Claims, 10 Drawing Sheets

(56) References Cited

U.S. PATENT DOCUMENTS

| | | | |
|---|---|---|---|
| 2013/0104022 A1* | 4/2013 | Coon | G06F 17/243 |
| | | | 715/226 |
| 2013/0198598 A1* | 8/2013 | Kirsch | G06F 16/957 |
| | | | 715/226 |
| 2014/0173407 A1 | 6/2014 | Kruglick et al. | |
| 2014/0173408 A1* | 6/2014 | Canaud | G06F 16/235 |
| | | | 715/226 |
| 2014/0258828 A1 | 9/2014 | Lymer et al. | |

OTHER PUBLICATIONS

Ming-Jui Huang et al., An integrated software processor with autofilling out web forms, Aug. 1, 2008, IEEE, pp. 1-8 (Year: 2008).*

The International Search Report (ISR) and Written Opinion of the International Searching Authority for PCT/US2017/059189 dated Feb. 13, 2018.

Anonymous: "Google Chrome Privacy Whitepaper" (Jan. 24, 2017).

* cited by examiner

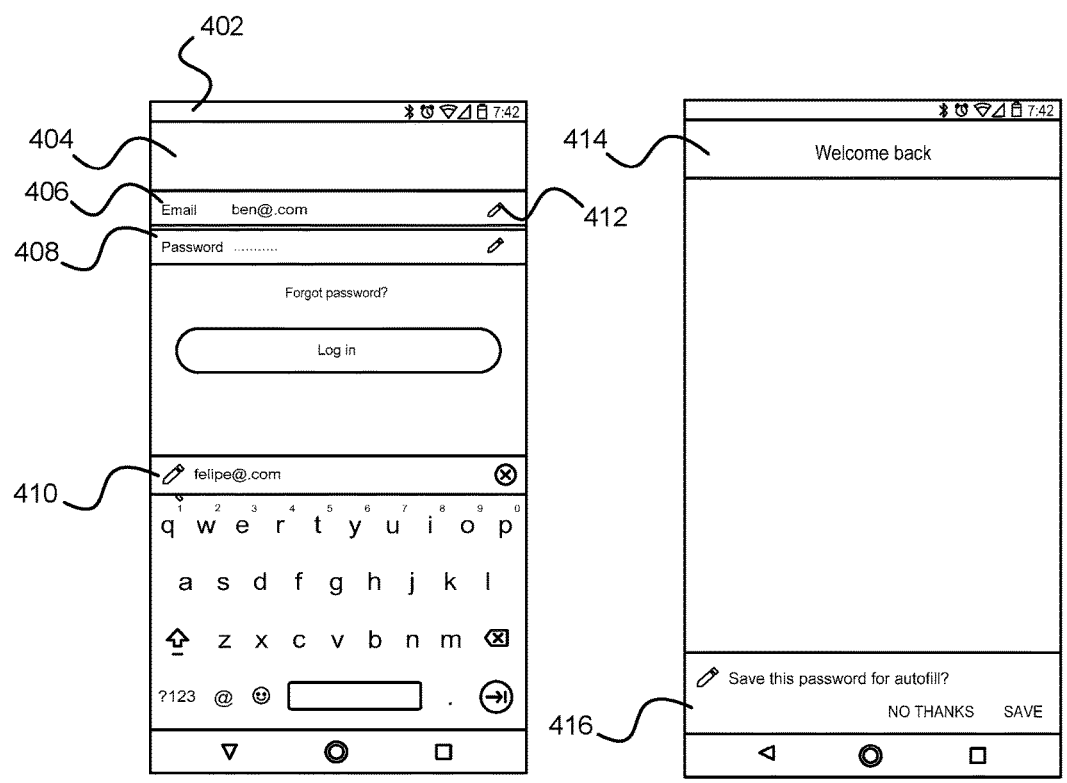

AUTOFILL FOR A USER DEVICE

CROSS-REFERENCE TO RELATED DISCLOSURES

This disclosure claims priority to U.S. Provisional Patent Application No. 62/468,011 filed on Mar. 8, 2017, which is incorporated herein by reference in its entirety.

BACKGROUND

Many modern computing devices, including mobile devices, mobile phones, personal computers, and tablets, provide user interfaces (UIs) for permitting users to interact with the computing device. For example, application programs can use the UI to communicate with a user using images, text, and graphical elements such as windows, dialogs, pop-ups, images, buttons, scrollbars, and icons. The UI can also receive inputs from devices such as touch screens, a presence-sensitive display, computer mice, keyboards, and other devices to permit the user to control the UI, and thus the application program.

In some cases, the UI can be used to interact ith an operating system to manage the computing device. For example, the operating system can have a control panel or setting application that uses the UI to draw one or more windows related to control settings for some aspect(s) of the computing device, such as audio controls, video outputs, computer memory, and human language(s) used by the operating system (e.g., choose to receive information in English, French, Mandarin, Hindi, Russian, etc.). The control panel/settings application can receive subsequent input related to the window(s) using the UI. The UI can provide the inputs to the operating system, via the control panel/settings application, to manage the computing device.

However, manually entering data into a UI can be inconvenient, slow and/or cumbersome for users or may generate errors, especially on mobile devices that may have a small UI.

SUMMARY

Example embodiments relate to a system that allows a user to engage the operating system of a user device to facilitate autofill across multiple applications with the help of a remote provider. More specifically, the operating system may determine that it can engage in autofill for a particular application. Then, based on the user's authorization for this autofill, the operating system may recognize content displayed on the user device that should be transmitted to a remote provider to aid in facilitating autofill and send a request to the remote provider containing that content. After receiving the response from the remote provider containing data associated with the content in the request, the operating system may then autofill the application with associated data.

In one aspect, a method is provided that includes receiving, by a user device via a user interface (UI), authorization to engage in autofill for an application displayed on the UI of the user device. The method further includes detecting an autofill trigger event while the application is displayed on the UI. The method also includes, responsive to detecting the autofill trigger event, determining a subset of content displayed on the UI, wherein the subset excludes user-specific information. The method additionally includes transmitting a request to a remote provider for candidate data for use in autofill for the application, wherein the request comprises the subset of content displayed on the UI. The method further includes receiving a response from the remote provider, wherein the response comprises one or more candidate values corresponding to one or more text input fields displayed on the The method also includes filling the one or more text nput fields displayed on the UI with the corresponding one or more candidate values.

In another aspect, a user device is provided. The user device includes a UI and an operating system configured to receive authorization to engage in autofill for an application of the user device. The operating system is further configured to detect an autofill trigger event. The operating system is also configured to, responsive to detecting the autofill trigger event, determine, a subset of content displayed on the UI, wherein the subset excludes user-specific information. The operating system is additionally configured to transmit a request to a remote provider for candidate data for use in autofill for the application, wherein the request comprises the subset of content displayed on the UI. The operating system is further configured to receive a response from the remote provider, wherein the response comprises one or more candidate values corresponding to one or more text input fields displayed on the UI. The operating system is also configured to fill the one or more candidate values into the corresponding one or more text input fields displayed on the UI.

In another aspect, a non-transitory computerdable medium is provided having stored therein instructions executable by one or more processors to cause an operating system of a user device to perform functions. The functions include receiving, via a UI, authorization to engage in autofill for an application displayed on the UI of the user device. These functions also include detecting an autofill trigger event. These functions further include, responsive to detecting the autofill trigger event, determining a subset of content displayed on the UI, wherein the subset excludes user-specific information. These functions additionally include transmitting a request to a remote provider for candidate data for use in autofill for the application, wherein the request comprises the subset of content displayed on the UI. These functions also include receiving a response from the remote provider, wherein the response comprises one or more candidate values corresponding to one or more text input fields displayed on the UI. These functions further include filling the one or more text input fields displayed on the UI with the corresponding one or more candidate values.

In another aspect, a system is provided that includes a UI, at least one processor, and a non-transitory computer readable medium having stored therein instructions (that when executed by the at least one processor, cause the at least one processor to perform functions). The system includes means for receiving authorization to engage in autofill for an application of the user device. The system also includes means for detecting an autofill trigger event. The system further includes means for, responsive to detecting the autofill trigger event, determining, a subset of content displayed on the UI, wherein the subset excludes user-specific information. The system additionally includes means for transmitting a request to a remote provider for candidate data for use in autofill for the application, wherein the request comprises the subset of content displayed on the UI. The system also includes means for receiving a response from the remote provider, wherein the response comprises one or more candidate values corresponding to one or more text input fields displayed on the UI. The system further includes means for filling the one or more text input fields displayed on the UI with the corresponding one or more candidate values.

The foregoing summary is illustrative only and is not intended to be in any way limiting. in addition to the illustrative aspects, embodiments, and features described above, further aspects, embodiments, and features will become apparent by reference to the figures and the following detailed description and the accompanying drawings.

FIG, 3D shows user interface functionality associated with a secured authorization prompt eliciting biometric input data, in accordance with example embodiments.

Figure 3A:
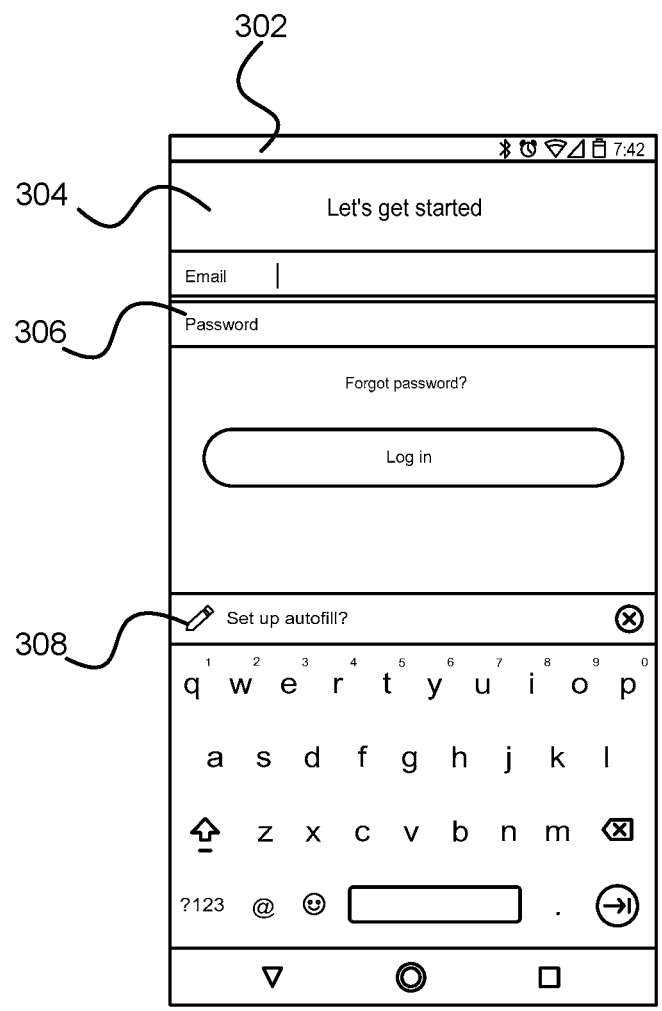
FIG. 3A illustrates a prompt for a user to set up autofill, in accordance with example embodiments.
Figure 3B:
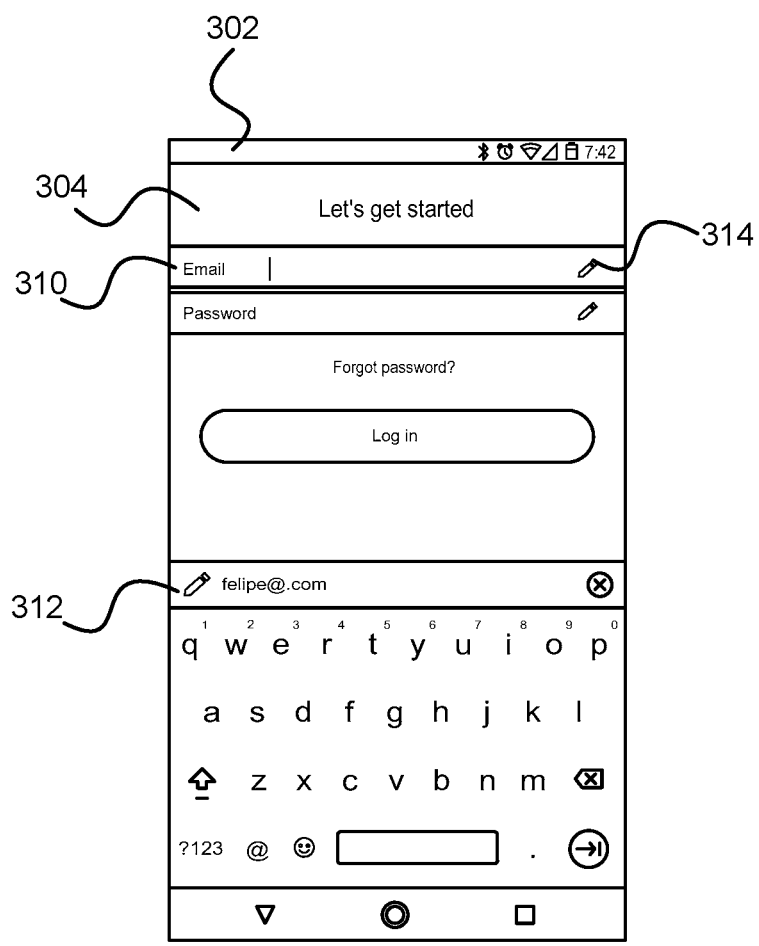
FIG. 3B illustrates a displayed data set identifier for selection via the UI of a user device, in accordance with example embodiments.
Figure 3C:
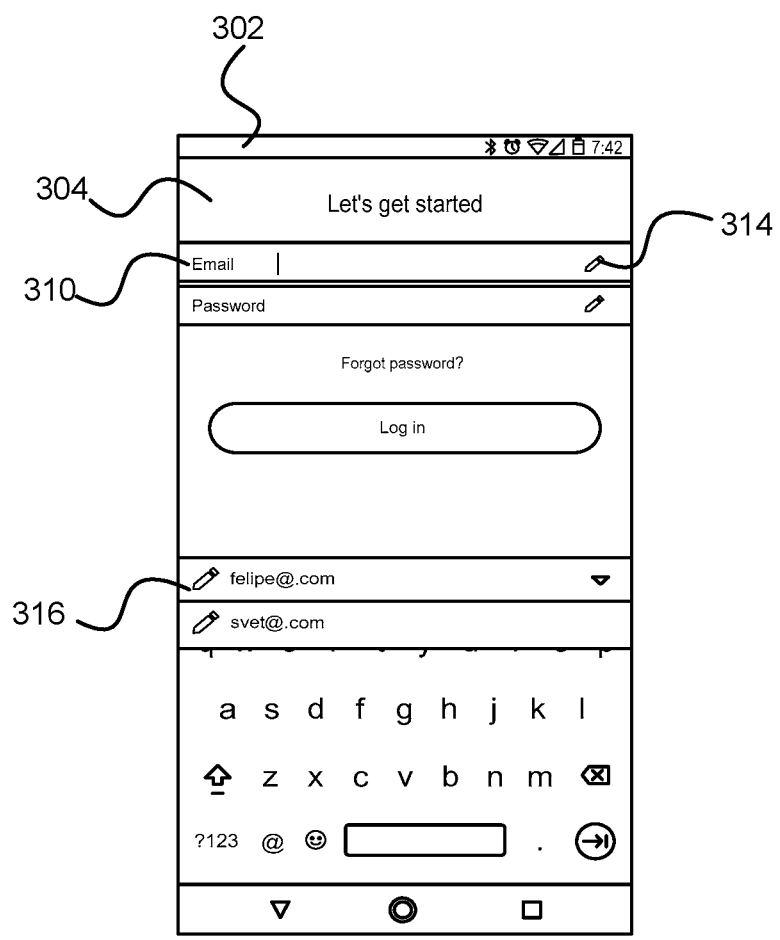
FIG. 3C illustrates a plurality of displayed data set identifiers for selection via the UI of a user device, in accordance with example embodiments.
Figure 3D:
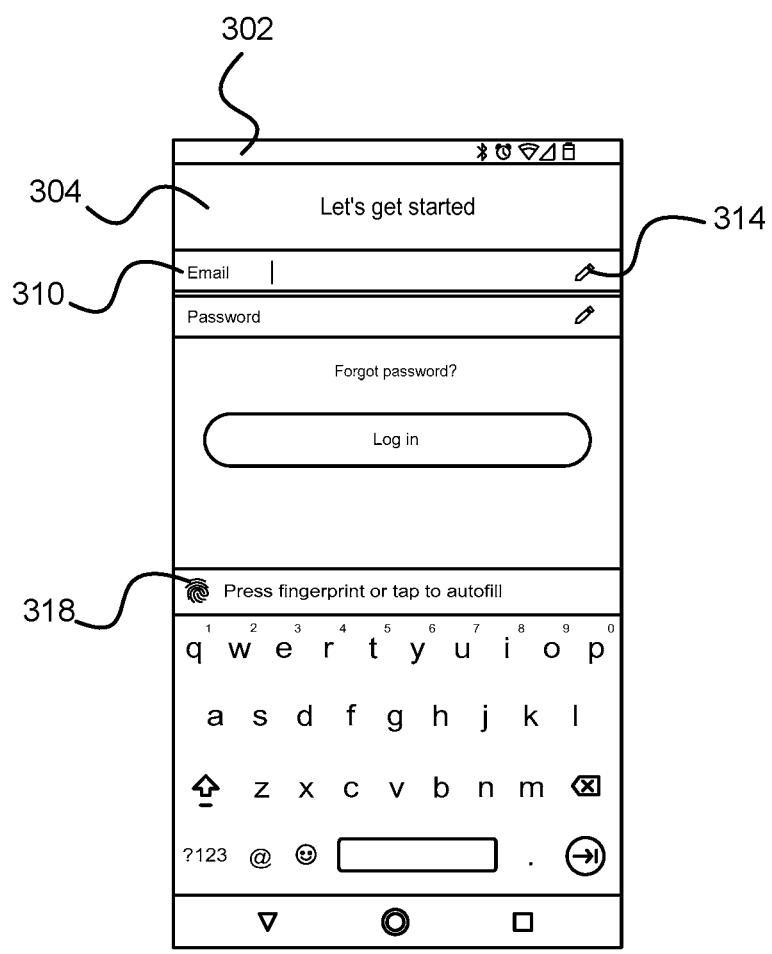
Figure 3E:
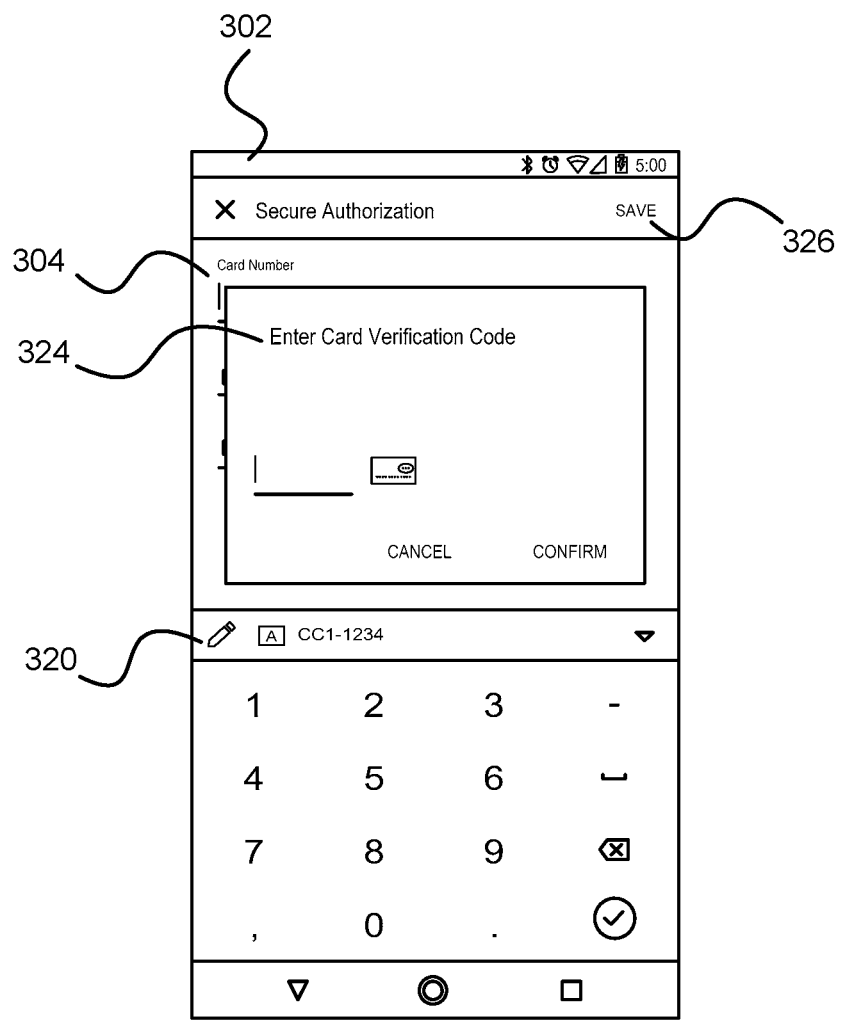

FIG. 3E shows user interface functionality associated with a secured authorization prompt eliciting a card verification code, in accordance with example embodiments.

Figure 3F:
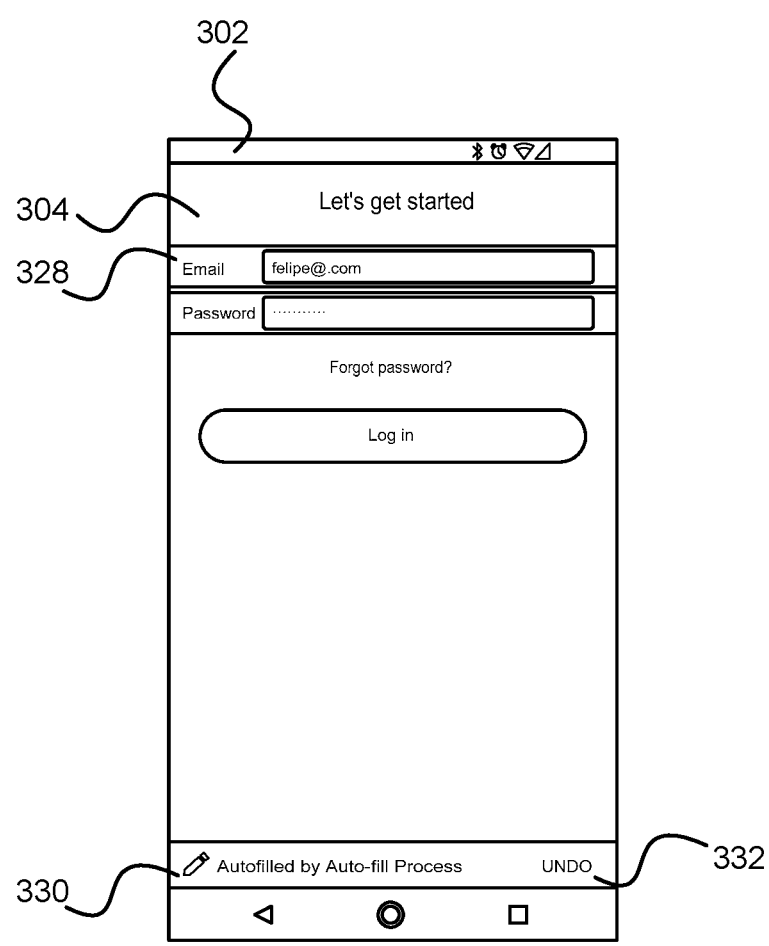

FIG. 3F shows values filled into corresponding text input fields displayed on the UI of a user device, in accordance with example embodiments.

FIG. 4A shows user interface functionality associated with a user's manual entry of data into the text input fields of an application displayed on the UI, in accordance with example embodiments.

FIG. 4B illustrates a confirmation message and data-save prompt associated with the user's manual entry of data shown in FIG. 4A, in accordance with example embodiments.

Figure 5:
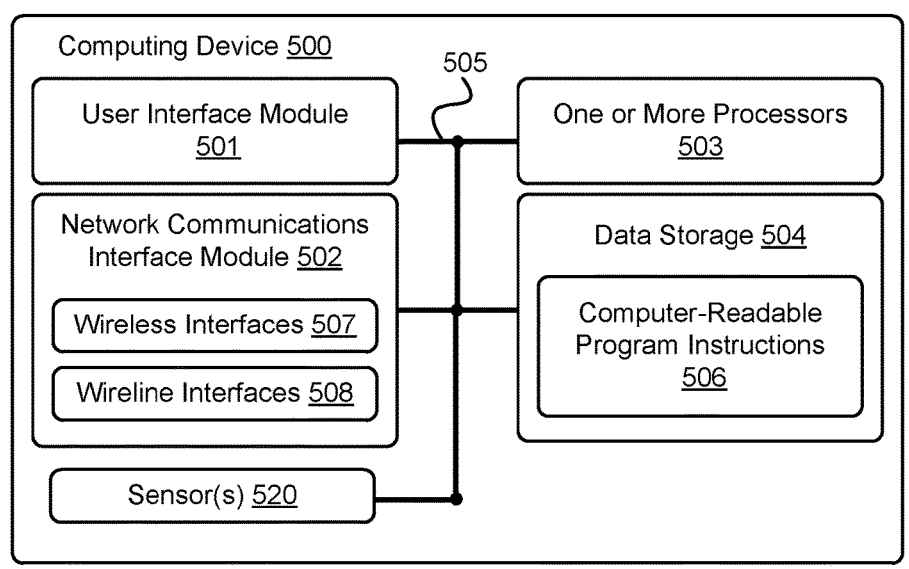

FIG. 5 is a functional block diagram of an example computing device, in accordance with example embodiments.

DETAILED DESCRIPTION

Example methods and systems are described herein, Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

It will be readily understood that the aspects of the present disclosure, as generally described herein, and illustrated in the Figures, can be arranged, substituted, combined, separated, and designed in a wide variety of different configurations, all of which are contemplated herein.

I. Overview:

User devices, including mobile devices, mobile phones, personal computers, and tablets, are ubiquitous in modern communication networks. Many of these devices are capable of running one or more applications while facilitating communication within such networks. Further, many of these devices also provide one or more UIs for permitting users to interact with the user device.

For example, a user may use a UI to communicate information to be used by an application on the user device through the use of images, text, and other graphical elements. The UI can also receive inputs from numerous devices connected to the user device, such as touch screens, a presence-sensitive display, computer mice, keyboards, and other devices that permit the user to control the UI, and thus the application.

In an optimal scenario, the user would be able to effectively and efficiently use the UI to communicate such information; however, one or more factors may impose a limitation on the user's ability to do so. Thus, if operating under such a limitation, as the need to communicate more and more information grows, the ability to communicate his information effectively and efficiently may become restricted.

By way of example, for user devices with small screens, typing extensive amounts of text into the UI to communicate information to be used by an application may be very difficult, especially if the text is also difficult for the user to remember. Accordingly, it may be advantageous for the application to be able to remember this information as it would not have to be recommunicated the next time the application was to be employed by the user. It is plausible, however, that as the number of applications with which a user attempts to communicate grows, the burden imposed by using the UI to communicate extensive amounts of text to each of these applications (for the first time or otherwise) may burden the user. And, this may be true even if individual applications remember information entered by the user. As a result, users may become less engaged in these applications (or abandon their use altogether) once prompted to enter such information.

Disclosed herein are example embodiments relating to methods, systems, and devices that allow the user of the user device to effectively and efficiently communicate information to be used by such applications by engaging the operating system of the user device to serve as an intermediary to facilitate autofill across multiple applications with the help of a remote provider. Specifically, the example embodiments disclosed herein allow a user to use autofill at the operating system level of the user device by, in part, enabling autofill, allowing any authorized remote provider to provide data for autofill, retrieving autofill data, and saving autofill data for future use.

In an examplembodiment, in accordance with the disclosure, the operating system of the user device may receive authorization from the user to engage in autofill for an application displayed on the UI of the user device. For example, to enable autofill, the operating system may determine that a text input field is associated with a common autofill descriptor e.g., the text input field is associated with a term such as "password" or "username"), and then prompt the user to set up autofill. In a further aspect, if the user only has one remote provider designated to help facilitate autofill, the user may be prompted to agree to use that remote provider; but if there are multiple remote providers designated, the user may be prompted to choose one or more remote providers. In either scenario, however, because engaging the operating system to perform autofill functions can involve sensitive and/or personal information specific to the user, the operating system may apprise the user of the details underlying the authorization of the autofill. These details may include accepting a detailed agreement concerning the operating system and/or a disclaimer associated with each remote provider, to inform the user and confirm her consent before authorizing the use of autofill with one or more of these remote providers.

In a further aspect, the operating system may also detect an event which triggers the operating system to examine the contents displayed on the UI. In example embodiments, this event may include: the initiation of the application; the selection of a text input field on the application; or a signal that a text input field has focus (e.g., a particular text field has become engaged such that a keyboard is displayed on the UI), among other illustrative examples.

Then, once the operating system has detected such an event, and the operating system has examined the content displayed on the UI, the operating system may also determine what portion of this content does not contain sensitive user-specific information. In a further aspect, utilizing this portion of the content, the operating system may send a request to a remote provider to help facilitate autofill for the application by providing candidate date for use in the application. In this embodiment, such a request may be beneficial for the operating system and the user alike as it may allow the remote provider to securely and privately parse the content displayed on the UI to determine what information may be useful for facilitating autofill for the application (e.g., determining what text input fields on the application may be autofilled).

Once such a request has been sent to a remote provider, the operating system may receive a response to the request containing a set of candidate values corresponding to the one or more text input fields of the application displayed on the UI. Additionally, in further embodiments, the operating system may display a secure authorization prompt and receive user input data directed at the prompt before actually receiving such a response from the remote provider. This secure authorization prompt may include a request for biometric input information, among other illustrative examples.

Either way, once this response is received, the operating system may fill the text input fields of the application displayed on the UI with one or more corresponding candidate values.

In another embodiment, the response may also contain a data set identifier corresponding to the set of candidate values. If multiple sets of candidate values are contained in the response, assigning each an identifier may be beneficial for the management of the information contained therein by the user and the operating system. Additionally, in further embodiments, the operating system may display a secure authorization prompt and receive user input data directed at the prompt before receiving a response from the remote provider. This secure authorization prompt may include a request for a card verification code or a personal identification number, among other illustrative examples.

Once this response is received, the operating system may also display the data set identifier or identifiers contained in the response. The operating system may then receive input data from a user indicating the user's selection of a data set identifier corresponding to alues to be used in filling the text input fields of the application. In one embodiment, the identifier corresponding to the set of candidate values received from the remote provider may be displayed for the user's selection. In a further aspect, this displayed information may be a list of identifiers (in a drop-down menu or otherwise), wherein each identifier corresponds to a set of candidate values received from the remote provider. In a further aspect, once a data set identifier is selected, the operating system may then fill the set of candidate values corresponding to the selected data set identifier into the text input fields of the application displayed on the UI.

In another embodiment, a fill indicator (in the form of a graphic received from the remote provider or otherwise) may be displayed in the text input fields to be filled with these candidate values before the user selects a data set. And, in yet another embodiment, the operating system may receive a user's preselection of a data set identifier from a list of identifiers and display a fill indicator in the text input fields of the application that could be filled with the candidate values associated the preselected data set identifier.

In another embodiment, a remote provider may be provided with user data for future autofill use after manually entering data in the text input fields of an application displayed on the UI. More specifically, after receiving this data, the operating system may prompt the user to save the input data for future use and send the data to the remote provider selected by the user to help facilitate autofill for the application. In one embodiment, to save such input data for autofill, once the input data is entered and the keyboard is dismissed, the user may be prompted to save the input data for future autofill uses. In a further aspect, the saving of this data may be accomplished by the operating system immediately transmitting the input data to the remote provider, or by temporarily holding the data until the user responds to the prompt, at which point, the operating system may send the data to the remote provider.

II. Distributed Computing Architecture

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Figure 1:
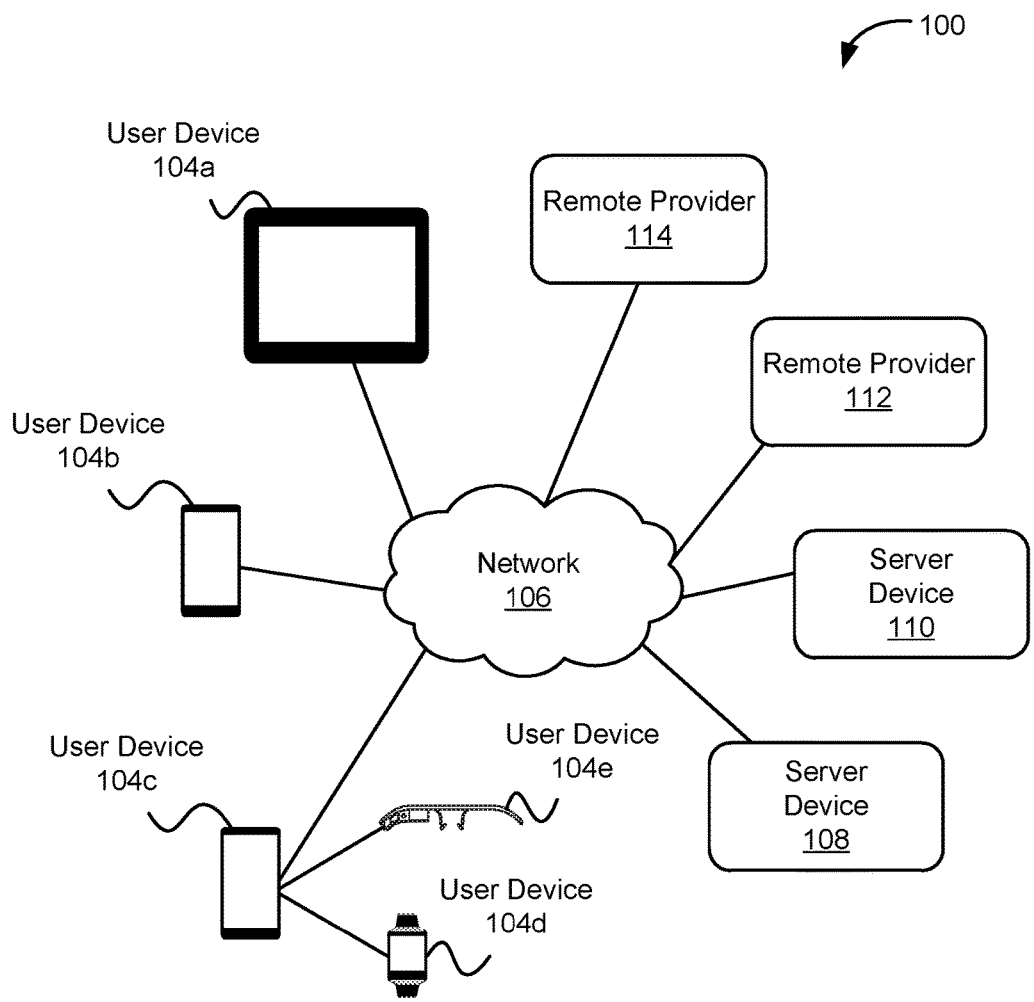
FIG. 1 depicts a distributed computing architecture, in accordance with example embodiments.

FIG. 1 depicts a distributed computing architecture 100 with server devices 108, 110 configured to communicate, via network 106, with user devices 104*a*, 104*b*, 104*c*, 104*d*, 104*e*, and remote providers 112 and 114, in accordance with example embodiments. Network 106 may correspond to a local area network (LAN), a wide area network (WAN), a corporate intranet, the public Internet, or any other type of network configured to provide communication paths between networked computing devices. Network 106 may also correspond to a combination of one or more LANs. WANs, corporate intranets, and/or the public Internet.

Although FIG. 1 only shows a small collection of user devices, distributed application architectures may serve tens, hundreds, or thousands of user devices. Moreover, user devices 104*a*, 104*b*, 104*c*, 104*d*, 104*e* (or any additional programmable devices) may be any sort of computing device capable of allowing a user to engage the operating system of the computing device to facilitate autofill across multiple applications with the help of a remote provider, such as an ordinary laptop computer, desktop computer, wearable computing device, mobile computing device, head-mountable device (HMD), network terminal, wireless communication device (e.g., a smartphone or cell phone), and so on. In some embodiments, such as indicated with user devices 104a, 104b, and 104c, user devices can be directly connected to network 106. In other embodiments, such as indicated with user devices 104d and 104e, user devices can be indirectly connected to network 106 via an associated computing device, such as user device 104c. In such embodiments, user device 104c can act as an associated computing device to pass electronic communications between user devices 104d and 104e and network 106. In still other embodiments not shown in FIG. 1, a user device can be both directly and indirectly connected to network 106.

Server devices 108, 110 may operate as part of a cloud-based server system that shares computer processing resources and data to computers and other devices on demand. In particular, server devices 108, 110 can be configured to perform one or more services requested by user devices 104a-104e. For example, server device 108 and/or 110 can provide content to user devices 104a-104e. In a further aspect, server device 108 and/or 110 may provide content to user devices 104a-104e directly or by facilitating the transmission of content requested from a third party. The content can include, but is not limited to, web pages, hypertext, scripts, binary data such as compiled software, images, audio, and/or video. The content can include compressed and/or uncompressed content. The content can be encrypted and/or unencrypted.

Remote providers 112, 114 may also operate as part of a cloud-based server system that shares computer processing resources and data to computers and other devices on demand. In particular, remote providers 112, 114 may provide, receive, store, manage, and transmit content on the network 106, in accordance with example embodiments. For example, remote provider 112 and/or 114 can receive a request for content to be used by user devices 104a-104e, and generate and transmit a response containing the content to devices connected to the network.

Within examples, server device 108 and/or 110 may provide content that facilitates autofill across multiple applications on user devices 104a-104e with the help of remote provider 112 and/or 114. Additionally, server device 108 and/or 110 can provide user devices 104a-104e with access to software for database, search, computation, graphical, audio, video, World Wide Web/Internet utilization, and/or other functions. Many other examples of content are possible as well.

III. Method Flowchart and Example Embodiments

Figure 2:
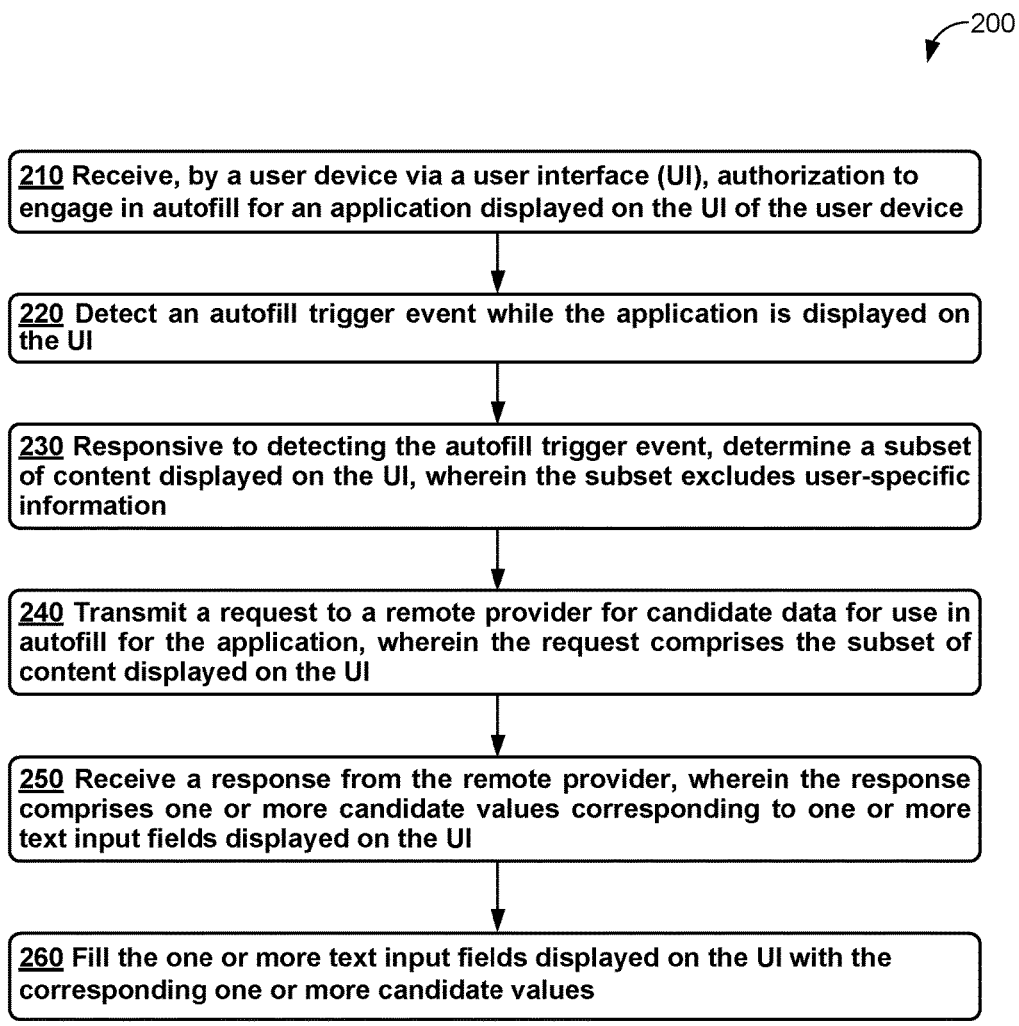
FIG. 2 is a flowchart of a method, in accordance with example embodiments.

FIG. 2 illustrates a flowchart showing a method 200 that may be performed to allow a user to engage the operating system of a user device to facilitate autofill across multiple applications with the help of a remote provider. Method 200 may be carried out by one or more computing devices, such as the user devices 104a-104e and remote provider 112 and/or 114, and in some instances server 108 and/or 110 as well, as illustrated and described with respect to FIG. 1. In additional examples, method 200 may be carried out by user devices 104a-104e and remote provider 112 and/or 114, and in some instances server 108 and/or 110 as well, operating as part of a cloud-based system. Additionally, method 200 may be performed by one or more other types of computing devices besides those specially illustrated in FIG. 1.

Additionally, although the steps of method 200 are described below as being completed by an operating system, other components, applications, and/or technologies related to the user device could perform the steps of method 200.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 2. Where used, program code can be stored on any type of computer-readable medium, for example, such as a storage device including a disk or hard drive.

In addition, each block of the flowchart shown in FIG. 2 may represent circuitry that is wired to perform the specific logical functions in the process. Unless specifically indicated, functions in the flowchart shown in FIG. 2 may be executed out of order from that shown or discussed, including substantially concurrent execution of separately described functions, or even in reverse order in some examples, depending on the functionality involved, so long as the overall functionality of the described method is maintained.

At block 210, method 200 may include receiving by an operating system of a user device via a UI, authorization to engage in autofill for an application displayed on the UI of the user device. In particular, a user may be interacting with a computing device and decide to interact with an application on that device. Once, or before, the user selects the application, however, he may be prompted to authorize the operating system of the mobile to help autofill the application and/or other applications. More specifically, the operating system may recognize that the user is interacting with an application and that there is content that the operating system knows is relevant to autofilling the application. In accordance with this data, the operating system may then prompt the user to authorize the operating system to engage in autofill for the application, which may improve the user's interaction with, and/or the responsiveness of, user interface functionality.

In general, the operating system can recognize certain data that is commonly associated with autofill. In an example, the operating system may recognize that a text input field associated with an application contains or is associated with a common autofill descriptor (e.g., "password" or "username"). in response, in this example, the operating system may then prompt the user to set up autofill.

In some examples, before, after, or during the user's response to this prompt, the operating system may also compile a list of one or more remote providers to further aid in facilitating autofill. In one aspect, if there is only one remote provider designated to help facilitate autofill, the user may be prompted with an agreement to use that remote provider. In another aspect, however, if there are multiple remote providers designated to help facilitate autofill, then the user may be prompted to choose a remote provider and also prompted with an agreement to use that remote provider. In yet another aspect, the user may be allowed to choose more than one remote provider, but still may be prompted with an agreement to use each of the chosen remote providers.

In general, in either scenario, the operating system may review sensitive and/or personal information when engaging in autofill, and it may be advantageous for the user to be informed of the details of this autofill before consenting to its use. Specifically, because the operating system may review content on the device containing sensitive and/or personal information, the the operating system may inform the user of the details underlying the authorization of the autofill before engaging in autofill.

In a further aspect, because the chosen remote provider may receive some information that the user may not typically share, the user may also be prompted to approve an agreement containing the terms for using each of the autofill providers chosen by the user. In some examples, in order to ensure that the user fully understands the details for using these autofill providers, before authorizing the use of autofill, the user may be prompted with an agreement that may include a disclaimer for using the operating system and/or each of the autofill providers chosen by the user for autofill.

In still other examples, before authorizing the use of autofill, the user may he prompted with a verified transmission prompt authorizing the operating system to send one or more values entered into one or more text input fields displayed on the UI to a remote provider. For example, the user may have entered the one or more values into an application other than the one that served as the basis for the operating system's prompt for the user to set up autofill (a "second application" . In a further aspect, once authorized by the user to do so, the operating system may then transmit the one or more values to the remote provider for future use.

At block 220, method 200 further includes detecting, by the operating system, an autofill trigger event while the application is displayed on the UI. Autofill trigger events may provide information about the current state of the user device, or an application thereon, including the state of user's interaction with the device. Autofill trigger events may also be used to help the operating system know when to engage in authorized autofill at the tight points in time. In some examples, autofill triggers events may be direct or indirect user interactions with the device. In general, once autofill is approved by the user, however, user interaction with the device may be monitored by the operating system.

In one embodiment, example autofill trigger events may be indicated by data associated with direct user interaction with the user device, such as a user's initiation of an application, a user's selection of a text input field of an application, or a request from the user set up autofill for one or more applications, among other scenarios.

In other examples, the autofill trigger events may include data associated with indirect user interaction with the user device, such as a signal that an application has been initiated, or a signal that a text input field of the application, or some other parameter of content displayed on the UI. of the user device, has focus, among other scenatios. In a further aspect, the user's indirect interaction with the user device may be reflected by a graphic or GUI, such as a keyboard, displayed on the UI.

At block 230, method 200 may further include responsive to detecting the autofill trigger event, determining, by the operating system, a subset of content displayed on the UI, wherein the subset excludes user-specific information.

In general, the content displayed on the UI refers to any information associated with an application that is ascertainable by the operating system. In one example, this content may include a current view hierarchy of the content displayed on the UI of the user device. Because, however, the content may also contain information that is sensitive and/or private, the operating system determines only a subset of the content which excludes the user-specific information.

In some examples, the user-specific information may include personally identifiable information, or any other information that can be used on its own or with other information to identify, contact, or locate a single person, or to identify an individual in the context of other information or data. In additional examples, the user-specific information may include information that the user has designated as sensitive and/or private.

In still other examples, the user-specific information may include information that has been designated as sensitive and/or private based on one or more factors associated with the user. For example, the user-specific information may include information that has been designated as sensitive and/or private based on the geographical region in which the user, the user device, and/or the remote provider, is located, among other possibilities. In other examples, the user-specific information may include information that has been designated as sensitive and/or private based on an at ibute of the user (e.g., the user's age).

At block 240, method 200 may further include transmitting, by the operating system, a request to a remote provider for candidate data for use in autofill for the application, wherein the request comprises the subset of content displayed on the UI. The request for candidate data is sent to the remote provider selected to help facilitate the use of autofill on the user device. Specifically, based on the subset of displayed content excluding user-specific information, the operating system may send a request containing information within or associated with this subset of content to the remote provider to alert the remote provider of, amongst other things, potentially fillable fields displayed on the UI. In any event, this request may be beneficial for the operating system and the user alike as it may allow the remote provider to securely and privately parse the content displayed on the UI to determine what information may be useful for facilitating autofill for the application (e.g., determining what text input fields on the application may be autofilled).

In some examples, the request may include information associated with the text input fields displayed on the In one aspect, this information may include one or more descriptors associated with the text input fields. For example, these descriptors may include terms such as "name," "username," "email," "password," "address," "city," "state," "zip code," "country," "account number," and/or "card number," among other possibilities.

In other examples, the request may include information associated with the current view hierarchy of the user device. In one aspect, this information may include information associated with compiling or maintaining the subset of content displayed on the UI (e.g., underlying script and/or code). In another aspect, this information may include information associated with certain approximations of the subset of content displayed on the UI (e,g, wireframe representations of the subset of content). In yet another aspect, this information may include information associated with the architecture of the subset of content displayed on the UI (e.g., information associated with the relative layout, linear layout, buttons, table layout, table rows, check boxes, and/or other elements).

At block 250, method 200 may further include receiving, by the operating system, a response from the remote provider, wherein the response comprises one or more candidate values corresponding to one or more text input fields displayed on the UI. In general, the response received from the remote provider may provide data that is helpful to the operating system in facilitating autofill.

In one example, the response may contain data helpful to the operating system in facilitating autofill in the first instance. For example, the response may contain a data set comprising a set of candidate values corresponding to the one or more text input fields of the application displayed on the UI.

In another embodiment, the response received from the remote provider may elicit further input data from the user before disclosing the information requested by the operating system. Specifically, in some embodiments, the response may contain a pre-communication signal eliciting the input of data associated with the user before sending the data set requested by the operating system. In some examples, this input data may include data associated with the user's fingerprint or some other biometric data. In a further aspect, once this request for input data is received by the operating system, the operating system may generate and display a secure authorization prompt to apprise the user of this request. in yet a further aspect, the operating system may also facilitate the receipt of the input data and transmit a confirmation signal (which may include the input data) to the remote provider. For example, if the requested data pertained to the user's fingerprint data, the operating system may display a secure authorization prompt eliciting the user's fingerprint data, manage one or sensors directed at attaining the user's fingerprint data, receive the user's fingerprint data via one or more of those sensors, and then generate and transmit a confirmation signal (which may include the user's fingerprint data) to the remote provider. Other illustrative examples are certainly possible.

At block 260, method 200 may further include filling, by the operating system, the one or more text input fields displayed on the UI with the corresponding one or more candidate values. In general, the operating system can ensure that the one or more text input fields displayed on the UI are filled, accurately and completely, with the corresponding one or more candidate values.

In one aspect, the operating system may determine the location and sequence of the text input fields to be filled with the candidate values on the UI and collate the candidate values accordingly before filling the text input fields with the corresponding one or more candidate values.

In another aspect, the operating system may determine whether the one or more text input fields corresponding to the one or more candidate values to be used for autofill are actually displayed on the UI. For example, if the candidate values to be used for autofill correspond to text input fields for "username," "password," and "address," but the operating system determines the only text input fields displayed on the UI are for "username" and "password," then the operating system may take further action. In one example, the operating system may simply disregard the extraneous candidate value. In another example, the operating system may send a message apprising the remote provider that the extraneous candidate value was sent in error.

In yet another aspect, the operating system may determine whether the one or more text input fields may actually be filled with the corresponding one or more candidate values. For example, if one or more of the candidate values to be used for autofill do not comply with a parameter of the text input fields to which they correspond, then the operating system may take further action. in one example, a candidate value may contain noncompliant characters (e.g., too any characters, incorrect character type, etc.) in view of one or more requirements of the corresponding text input field. For example, if the text input field requires a three digit numeric card verification code and the corresponding candidate value is the word "Faulkner," then the candidate value may contain noncompliant characters for at least two reasons (noncompliant length and noncompliant character type). In response, in one example, the operating system may simply disregard the noncompliant candidate value. In another example, the operating system may send a message apprising the remote provider that the noncompliant candidate value was sent in error. In yet another example, the operating system may use some portion of the noncompliant candidate value (e.g., the first three characters, "Fau") to approximate one or more of the text input field requirements. Other illustrative examples are certainly possible.

IV. Further Example Embodiments

In other embodiments, the methods described herein may further include receiving, by the operating system, a response from the remote provider, wherein the response may also contain a data set containing a data set identifier.

In one example, the response may contain a data set comprising a set of candidate values corresponding to the one or more text input fields of the application displayed on the UI and a data set identifier associated with the set of candidate values. In another example, the response may contain a plurality of data sets, each of which comprise a set of candidate values corresponding to the one or more text input fields of the application displayed on the UI and a data set identifier associated with that set of candidate values specifically.

Additionally, although receiving a data set identifier associated with a set of candidate values may benefit the operating system and the user alike (as the user does not have to review all of the candidate data when deciding to use that data for autofill), if multiple sets of candidate values are contained in the response, having an identifier associated with each may be beneficial for the management of the information contained therein.

In a further aspect, the methods described herein may include displaying, by the operating system, the data set identifier for selection via the UI. In general, the data set identifier received from the remote provider may be associated with a set of candidate data corresponding to potentially finable fields displayed on the UI.

In one example, the response may contain a data set identifier helpful to the user for identifying associated candidate data to be used in autofill. For example, if the response contains a data set comprising a set of candidate values corresponding to the one or more text input fields of an application displayed on the UI and a data set identifier associated with the set of candidate values, then the data set identifier may be displayed on the UI to help the user understand the associated candidate values to be used for autofill. In another example, if the response contains a plurality of data sets, each of which comprise a set of candidate values corresponding to the one or more text input fields of the application displayed on the UI and a data set identifier associated with each set of candidate values specifically, then the data set identifiers may be displayed on the UI to help the user understand the candidate values associated with each data set identifier.

In a further aspect, displaying a data set identifier or identifiers associated with a set or sets of candidate values may benefit the operating system and the user alike (as the user may select a displayed data set identifier to use the candidate values associated with that identifier instead of reviewing all of the candidate data when deciding which candidate values the operating system should use for autofill).

In another example, if there are multiple sets of candidate values and associated identifiers, these identifiers may be displayed as a list of identifiers (in a drop-down menu or otherwise), each corresponding to a set of candidate values, for the user's selection.

In yet another example, a fill indicator may also be displayed in the text input fields that could be filled with these candidate values. Specifically, the fill indicator may allow the user to preview what text input fields will be autofilled with a particular set of candidate values before engaging in autofill. Further, the fill indicator may be displayed in the form of a graphic generated by the operating system (e.g, a pencil graphic) or a specific graphic received from the remote provider or otherwise (e.g., a brand or graphic associated with the remote provider). In one example, the operating system may receive a preselection of the displayed identifier or an identifier from the displayed list of identifiers and display a fill indicator in the text input fields of the application that could be filled with the candidate values associated the preselected identifier. In another example, the operating system may display a fill indicator in the text input fields of the application that could be filled with the candidate values associated with any of the identifiers from the displayed list of identifiers. Other illustrative examples are certainly possible.

Additionally, the methods described herein may further include receiving, by the operating system, input data indicating a selection of the data set identifier. In general, the receipt of the input data indicating the selection of a data set identifier may indicate to the operating system that the user is selecting the data set identifier and the candidate values associated with that identifier for use in autofill.

In one example, receiving input data indicating the selection of a displayed data set identifier may allow the operating system to use the candidate values associated with the selected identifier in autofill, with no further action by the user.

In another example, the displayed data set identifier may be reflective of a pre-communication signal received from the selected remote provider, which contains a data set identifier and, among other things, a secure authorization prompt, which may elicit further input data from the user (e.g., card verification codes, personal identification numbers, etc.) before sending the requested data.

In a further aspect, once the pre-communication signal is received, the operating system may display the secure authorization prompt eliciting the input data. And, in yet a further aspect, the operating system may also facilitate the receipt of the input data and transmit a confirmation signal (which may include the input data) to the remote provider. In one embodiment, the operating system may also prompt the user to save this input data for future use.

In another example, however, the displayed data set identifier may be reflective of a first pre-communication signal received from the selected remote provider, which contains only a data set identifier. In a further aspect, once received, the operating system may transmit the selection of this data set identifier to the remote provider, which may send a second pre-communication signal in response. This second pre-communication signal may contain, among other things, a secure authorization prompt, which may elicit further input data from the user (e.g., card verification codes, personal identification numbers, etc.) before sending the requested data.

In a further aspect, once this second pre-communication signal is received, the operating system may display the secure authorization prompt eliciting the input data. And, in yet a further aspect, the operating system may also facilitate the receipt of the input data and transmit a confirmation signal (which may include the input data) to the remote provider. In one embodiment, the operating system may also prompt the user to save this input data for future use, V. Additional Explanatory Figures and Example Embodiments FIG. 3A shows a prompt to set up autofill, in accordance with example embodiments. In particular, a user device 302 such as a cellular phone may display a portion of application 304 on the user device. The application 304 may also include text input fields containing or associated with a common autofill descriptor 306 (e.g., "password") In this example, once the operating system of the user device 302 recognizes a common autofill descriptor 306, the operating system displays a prompt to set up autofill 308. in further examples, as discussed above, after selecting to setup autofill, the user may be prompted to select one or more remote providers to help facilitate autofill and may also be prompted to review and approve one or more agreements associated with the selected provider.

FIG. 3B shows a displayed data set identifier for selection via the UI of the user device, in accordance with example embodiments. In particular, a user device 302 such as a cellular phone may display a portion of application 304 on the user device. In this example, as described above, in response to a text input field of the application having focus 310 (here, the "email" text input field has a vertical line indicating text can be typed into the field via the displayed keyboard), the operating system recognizes this focus, determines a subset of the content displayed on the that excludes user-specific information, transmits that subset of content to the remote provider, and once the response from the remote provided is received, displays, for the user's selection, the data set identifier 312 associated with the candidate values to be used in autofill. In further examples, the operating system may also display a fill indicator 314 (here, a pencil graphic) in the text input fields to be filled with the candidate values, which may also be influenced by a preselection of the displayed identifier.

FIG. 3C shows a plurality of displayed data set identifiers for selection via the UI of the user device, in accordance with example embodiments. Unlike the example embodiment in FIG. 3B, once the response from the remote provided is received, the operating system of the user device 302 displays, for the user's selection, a list of data set identifiers 316 associated with each of the candidate values to potentially be used in autofill. In further examples, the operating system may also display a fill indicator 314 (here, a pencil graphic) in the text input fields to be filled with the candidate values in a variety of ways. For example, in one aspect, the operating system may display a fill indicator 314 in the text input fields based on receiving a preselection of an identifier from the displayed list of identifiers. In another example, however, the operating system may display a fill indicator 314 in the text input fields that could be filled with the candidate values associated with any of the identifiers from the displayed list of identifiers. Other illustrative examples are certainly possible.

FIG. 3D shows user interface fUnctionality associated with a secured authorization prompt eliciting biometric input data, in accordance with example embodiments. Unlike the previous figures, in this example the response received from the remote provider contains a pre-communication signal eliciting the input of biometric data before sending the data set requested by the user. In a further aspect, the operating system may generate and display a secure authorization prompt 318 (here, a secure authorization prompt eliciting the user's fingerprint data) to apprise the user of this request. In yet a further aspect, the operating system may also facilitate the receipt of the input data and transmit a confirmation signal (which may include the input data) to the remote provider.

FIG. 3E shows user interface functionality associated with a secured authorization prompt eliciting a card verification code, in accordance with example embodiments. In particular, a user device 302 such as a cellular phone may display a portion of application 304 on the user device. In this example, as described above, the response received from the remote provided contains a first pre-communication signal containing one or more data set identifiers associated with candidate values to be used in autofill. Then, in response to receiving input data indicating the selection of a displayed data set identifier 320 associated with the candidate values to be used in autofill (here, credit card information corresponding to the displayed data set identifier), the operating system may transmit the selection of the data set identifier to the remote provider and receive a second pre-communication signal comprising a secure authorization prompt. In this example, the operating system may display a secure authorization prompt 324 (here, a request for the card verification code associated with the selected data set identifier). In yet a further aspect, the operating system may also facilitate the receipt of the input data, transmit a confirmation signal (which may include the input data) to the remote provider, and/or allow the user to elect to save 326 this input data and use it for future use.

FIG. 3F shows one or more values filled into the corresponding one or more text input fields displayed on the UI of the user device, in accordance with example embodiments. In particular, a user device 302 such as a cellular phone may display a portion of application 304 on the user device. In this example, in response to receiving input data indicating the user's selection of a data set identifier associated with the candidate values to be used in autofill, the operating system inputs 328 the one or more candidate values into the corresponding one or more text input fields displayed on the UI. In further examples, the operating system may also display a confirmation message 330 to apprise the user that the text input fields of the application displayed on the UI have been autofilled. In a further example the operating system may also display an undo prompt 332 to apprise the user that the text input fields of the application may be cleared of the data filled by the operating system during the autofill process.

FIG. 4A shows user interface functionality associated with a user's manual entry of data into the text input fields of an application displayed on the UI, in accordance with example embodiments. More specifically, a user device 402 such as a cellular phone may display a portion of application 404 on the user device. In this example, in spite of authorizing the operating system of the mobile to engage in autofill, the user may manually enter input data into a first text input field 406 (here, the "email" text input field) and a second text input field 408 (here, the "password" text input field). In a further aspect, the user may manually enter this input data in spite of one or more displayed data set identifiers 410 associated with the candidate values to be used in autofill and/or a displayed fill indicator 412 (here, a pencil graphic) in the text input field to be filled with the candidate values. In another example embodiment, in response to a user manually entering input data into a text input field, the operating system may filter the displayed data set identifiers and/or the associated candidate values to be used in autofill to limit the displayed data set identifiers and/or the associated candidate values to be used in autofill to those that match or correspond to the input data being manually entered by the user.

FIG. 4B illustrates a confirmation message and data-save prompt associated with the user's manual input of data into the text input fields of the application displayed on the UI as shown in FIG. 4A, in accordance with example embodiments. Specifically, once the user has manually entered input data associated with the text input fields displayed on the UI, the operating system may generate and display a confirmation message 414 to apprise the user that the text input fields of the application displayed on the UI have been filled. In a further example, the operating system may also display a prompt 416 allowing the user to save the input data entered into the text input fields of the application, which may also include transmitting the input data to the selected remote provider for future autofill use. In a further aspect, the operating system may save the input data for future autofill uses by temporarily holding the data until the user responds to the prompt, at which point, the operating system may send the data to the remote provider.

VI. Computing Device

In reference now to FIG. 5, FIG. 5 is a functional block diagram of computing device 500, in accordance with example embodiments. In particular, computing device 500 shown in FIG. 5 can be configured to perform at least one function of server device 108 and/or 110, and/or remote provider 112 and/or 114, any of user device 104a-104e, method 200, user device 302, and/or user device 402 as previously described.

Computing device 500 may include a user interface module 501, a network-communication interface module 502, one or more processors 503, data storage 504, and one or more sensors 520, all of which may be linked together via a system bus, network, or other connection mechanism 505.

User interface module 501 can be operable to send data to and/or receive data from external user input/output devices. For example, user interface module 501 can be configured to send and/or receive data to and/or from user input devices such as a keyboard, a keypad, a touch screen, a presence-sensitive display, a computer mouse, a track ball, a joystick, a camera, a voice recognition module, and/or other similar devices. User interface module 501 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 501 can also be configured to generate audible output(s), such as a speaker, speaker jack, audio output port, audio output device, earphones, and/or other similar devices. User interface module 501 can further be configured with one or more haptic devices that can generate haptic output(s), such as vibrations and/or other outputs detectable by touch and/or physical contact with computing device 500. In some embodiments, user interface module 501 can be used to provide a GUI for utilizing computing device 500, Network-communications interface module 502 can include one or more wireless interfaces 507 and/or one or more wireline interfaces 508 that are configurable to communicate via a network. Wireless interfaces 507 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 508 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 502 can be configured to provide reliable, secured, and/or authenticated communications. For each communication, information for ensuring reliable communications e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure .g, be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

One or more processors 503 can include one or more general purpose processors, and/or one or more special purpose processors (e.g., digital signal processors, graphics processing units, application specific integrated circuits, etc.). One or more processors 503 can be configured to execute computer-readable program instructions 506 that are contained in data storage 504 and/or other instructions as described herein.

Data storage 504 can include one or more computer-readable storage media that can be read and/or accessed by at least one of one or more processors 503. The one or more computer-readable storage media can include volatile and/or non-volatile storage components, such as optical, magnetic, organic or other memory or disc storage, which can be integrated in whole or in part with at least one of one or more processors 503. In some embodiments, data storage 504 can be implemented using a single physical device (e.g., one optical, magnetic, organic or other memory or disc storage unit), while in other embodiments, data storage 504 can be implemented using two or more physical devices.

Data storage 504 can include computer-readable program instructions 506 and perhaps additional data. In some embodiments, data storage 504 can additionally include storage required to perform at least part of the herein-described methods, scenarios, and techniques and/or at least part of the functionality of the herein-described devices and networks.

In some embodiments, computing device 500 can include one or more sensors 520. Sensor(s) 520 can be configured to measure conditions in an environment of computing device 500 and provide data about that environment. For example, sensor(s) 520 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to ead identifiers, such as RFD tags, barcodes, QR codes, and/or other devices and/or object configured to be read and provide at least identifying information; (ii) sensors to measure locations and/or movements of computing device 500, such as, but not limited to, a tilt sensor, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 500, such as, but not limited to, an infrared sensor, an optical sensor, a light sensor, a camera, a biosensor, a biometric sensor, a capacitive sensor, a touch sensor, a temperature sensor, a wireless sensor, a radio sensor, a movement sensor, a microphone, a sound. sensor, an ultrasound sensor, and/or a smoke sensor; and (iv) a force sensor to measure one or more forces (e.g., inertial forces and/or G-forces) acting about computing device 500, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 520 are possible as well.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A method comprising:
   receiving, by a user device via a user interface (UI), authorization to engage in autofill for an application displayed on the UI of the user device;
   detecting an autofill trigger event while the application is displayed on the UI;
   responsive to detecting the autofill trigger event, determining a subset of content displayed on the UI, wherein the subset excludes user-specific information;
   transmitting a request to a remote provider for candidate data for use in autofill for the application, wherein the request comprises the subset of content displayed on the UI;
   receiving a response from the remote provider, wherein the response comprises a data set comprising one or more candidate values corresponding to one or more text input fields displayed on the UI; and
   filling the one or more text input fields displayed on the UI with the corresponding one or more candidate values.

2. The method of claim 1, wherein the method of claim 1 is performed by an operating system of the user device, and wherein the data set further comprises a data set identifier, the method further comprising:
   displaying the data set identifier for selection via the UI;
   receiving input data indicating a selection of the data set identifier; and
   in response to receiving the input data, filling the one or more text input fields displayed on the UI with the corresponding one or more candidate values.

3. The method of claim 2, further comprising before receiving the input data indicating the selection of the data set identifier, displaying, by the operating system, a fill indicator in the text input fields fillable with the one or more candidate values.

4. The method of claim 3, wherein displaying, by the operating system, the fill indicator comprises displaying a graphic associated with the fill indicator, wherein the graphic is received from the remote provider.

5. The method of claim 2, wherein the response from the remote provider comprises a plurality of data sets, wherein each data set comprises a respective data set identifier and one or more candidate values corresponding to one or more text input fields displayed on the UI, and the method further comprises:
   displaying, by the operating system, the one or more data set identifiers via the UI; and
   receiving, by the operating system, input data indicating the selection of the data set identifier from the displayed one or more data set identifiers.

6. The method of claim 5, further comprising:
   receiving, by the operating system, a preselection of a data set identifier from the one or more data set identifiers; and
   displaying, by the operating system, a fill indicator, via the UI, in the text input fields fillable with the one or more candidate values corresponding to the preselected data set identifier.

7. The method of claim 5, further comprising:
   displaying, by the operating system, a fill indicator, via the UI, in the text input fields fillable with the one or more candidate values corresponding to any of the data set identifiers.

8. The method of claim 5, further comprising:
   in response to receiving input data indicating the selection of the data set identifier, generating, by the operating system, a respective secure authorization prompt, wherein the respective secure authorization prompt is displayed on the UI of the user device;
   receiving, by the operating system, a respective secure input communication to the respective secure authorization prompt; and
   in response to the respective secure input communication to the respective secure authorization prompt, filling, by the operating system, the one or more text input fields displayed on the UI with the one or more candidate values corresponding to the selected data set identifier.

9. The method of claim 5, wherein displaying, by the operating system, the data set identifiers via the UI comprises displaying the data set identifiers in a drop-down menu separated from the text input fields.

10. The method of claim 1, wherein the method of claim 1 is performed by an operating system of the user device, and wherein receiving, by the operating system of the device via the UI of the user device, authorization to engage in autofill for the application of the user device comprises:
    determining, by the operating system of the user device, a plurality of remote providers for candidate data;
    generating, by the operating system of the user device, a list of the plurality of remote providers for display on the UI of the device; and
    receiving, by the operating system of the user device, input data indicating a selection of a remote provider from the list, wherein the selected remote provider is authorized to receive autofill requests for the application.

11. The method of claim 1, wherein the method of claim 1 is performed by an operating system of the user device, and wherein, before receiving the response, the method further comprises:
- receiving, by the operating system, from the remote provider a pre-communication signal comprising a prompt to provide secure authorization;
- displaying, by the operating system, the secure authorization prompt;
- receiving, by the operating system, user input data based on the secure authorization prompt; and
- transmitting, by the operating system, a confirmation signal including the user input data to the remote provider.

12. The method of claim 11, wherein the secure authorization prompt comprises a request for a biometric input.

13. The method of claim 1, wherein the method of claim 1 is performed by an operating system of the user device, and wherein, before receiving the response, the method further comprises:
- receiving from the remote provider a first pre-communication signal comprising a data set identifier;
- displaying, by the operating system, the data set identifier for selection via the UI;
- receiving, by the operating system, input data indicating a selection of the data set identifier;
- transmitting, by the operating system, the input data indicating the selection of the data set identifier to the remote provider;
- receiving, by the operating system, from the remote provider a second pre-communication signal comprising a secure authorization prompt;
- displaying, by the operating system, the secure authorization prompt;
- receiving, by the operating system, user input data based on the secure authorization prompt; and
- transmitting, by the operating system, a confirmation signal including the user input data to the remote provider.

14. The method of claim 13, wherein the secure authorization prompt comprises a request for a card verification code, a personal identification number, or both.

15. The method of claim 1, wherein the method of claim 1 is performed by an operating system of the user device, and wherein, before receiving the authorization to engage in autofill for the application, the method further comprises:
- receiving, by the operating system, one or more values corresponding to one or more text input fields displayed on the UI corresponding to a second application;
- generating, by the operating system, a verified transmission prompt, wherein the verified transmission prompt authorizes the operating system to transmit the one or more values to the remote provider;
- displaying, by the operating system, the verified transmission prompt;
- receiving, by the operating system, verification to transmit the one or more values to the remote provider; and
- transmitting, by the operating system, the one or more values to the remote provider.

16. The method of claim 1, wherein detecting the autofill trigger event comprises detecting an initiation of the application.

17. The method of claim 1, wherein detecting the autofill trigger event comprises detecting a selection of a text input field of the application.

18. The method of claim 1, wherein the autofill trigger event comprises receiving a signal that a text input field has focus such that a keyboard is displayed on the UI.

19. A user device comprising:
- a user interface (IA); and
- an operating system configured to:
  - receive authorization to engage in autofill for an application of the user device;
  - detect an autofill trigger event;
  - responsive to detecting the autofill trigger event, determine, a subset of content displayed on the UI, wherein the subset excludes user-specific information;
  - transmit a request to a remote provider for candidate data for use in autofill for the application, wherein the request comprises the subset of content displayed on the UI;
  - receive a response from the remote provider, wherein the response comprises one or more candidate values corresponding to one or more text input fields displayed on the UI; and
  - fill the one or more text input fields displayed on the UI with the corresponding one or more candidate values.

20. A non-transitory computer readable edium haying stored therein instructions executable by one or more processors to cause an operating system of a user device to perform functions comprising:
- receiving, via a user interface (UI), authorization to engage in autofill for an application displayed on the UI of the user device;
- detecting an autofill trigger event;
- responsive to detecting the autofill trigger event, determining a subset of content displayed on the UI, wherein the subset excludes user-specific information;
- transmitting a request to a remote provider for candidate data for use in autofill for the application, wherein the request comprises the subset of content displayed on the UI;
- receiving a response from the remote provider, wherein the response comprises one or more candidate values corresponding to one or more text input fields displayed on the UI; and
- filling the one or more text nput fields displayed on the UI with the corresponding one or more candidate values.

* * * * *